May 2, 1933.　　　R. H. WEINERT　　　1,907,228
REVERSE GEAR
Filed Jan. 7, 1931　　　2 Sheets-Sheet 1
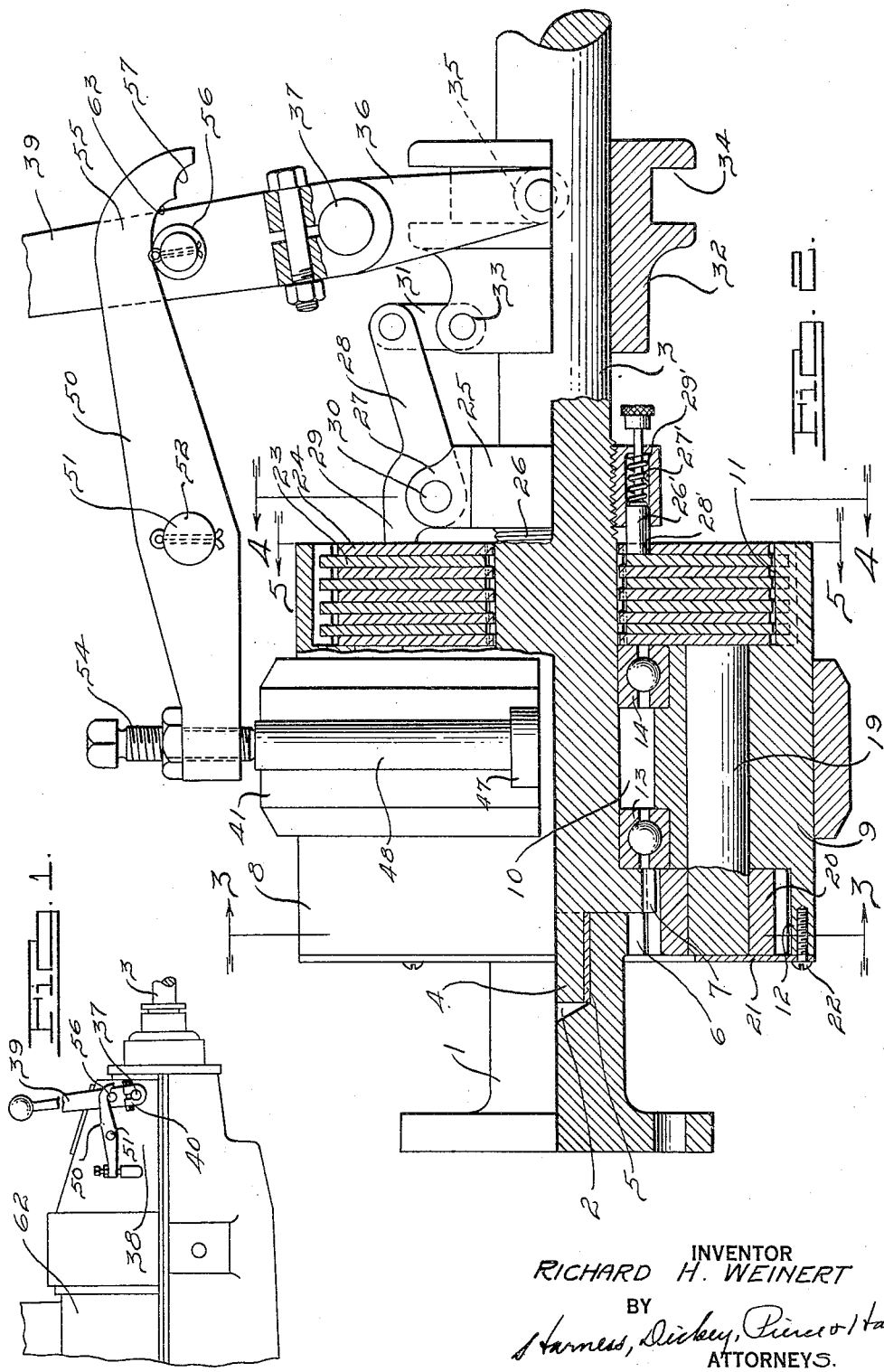
INVENTOR
RICHARD H. WEINERT
BY
Harness, Dickey, Pierce & Hann
ATTORNEYS.

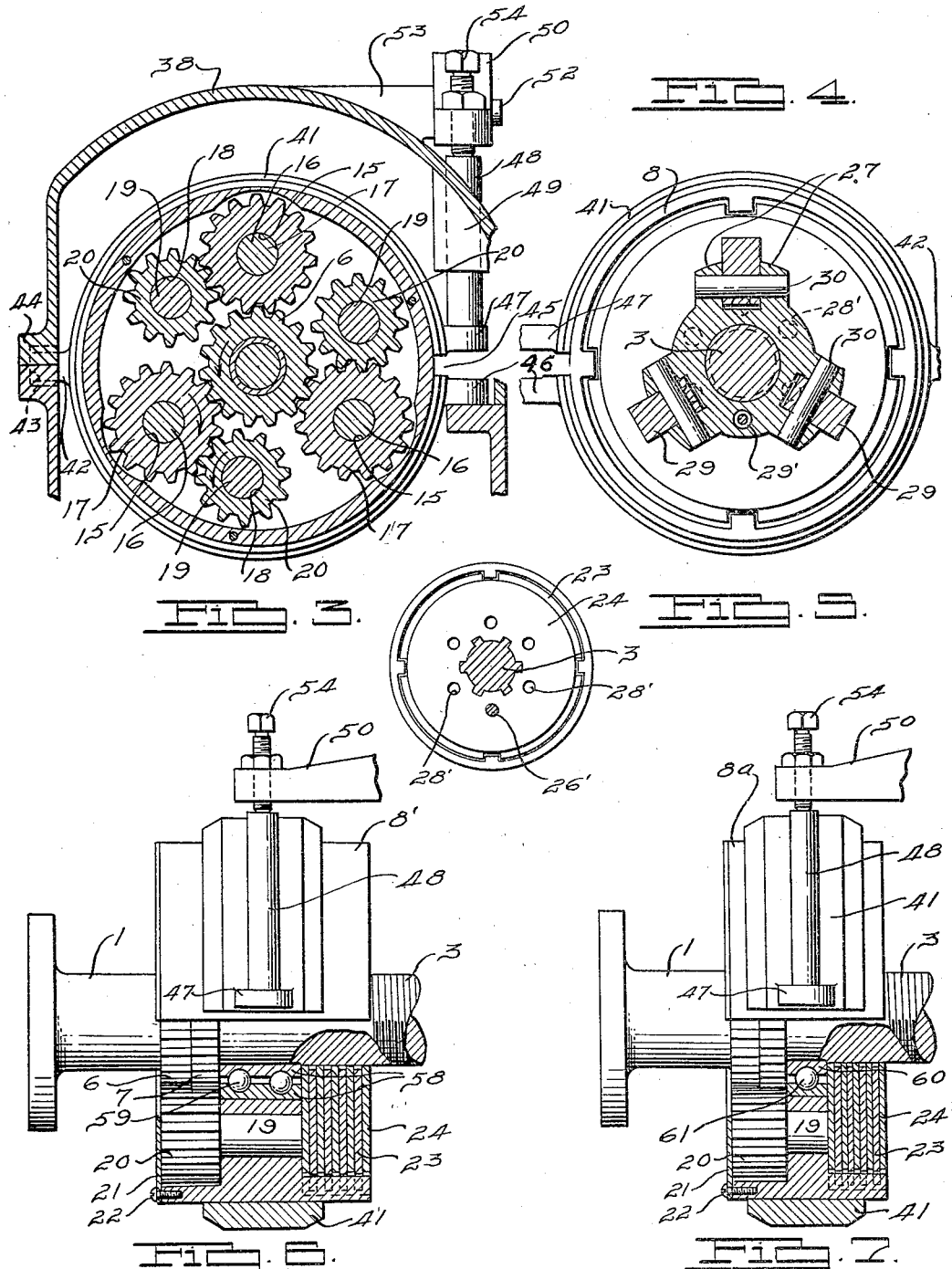

Patented May 2, 1933

1,907,228

UNITED STATES PATENT OFFICE

RICHARD H. WEINERT, OF DETROIT, MICHIGAN

REVERSE GEAR

Application filed January 7, 1931. Serial No. 507,067.

This invention relates to an improved reverse gearing particularly designed for use in marine propulsion.

The main objects of the invention are to provide reverse gearing of the planetary type for selectively rotating a driven shaft in the same direction as, or in an opposite direction to the rotation of a driving shaft; to provide a member of improved construction for forming such driving connections between the shafts of the reverse gearing which is rotatably supported solely on one of the shafts, and to provide an integral rotatable member of this character of simple and inexpensive construction which consists mainly of a rigid thick walled cylinder.

Other objects of the invention are to provide a cylindrical member of this kind which has recesses in its respectively opposite ends for receiving the pinions and clutch discs with which planetary gearing is customarily provided; to provide pins on one end of the cylindrical member for rotatably supporting the pinions and which are themselves supported at only one side of the pinions; and to provide bearing between the pinions and clutch discs of the transmission for supporting the rotatable cylinder independently of the remaining structure of the reversing gear.

Further objects of the invention are to provide clutch apparatus which has a disc exposed at one end of the rotatable cylindrical member; to provide improved clutch operating mechanism for frictionally engaging the discs of the clutch together; to provide means in mechanism of this character which bears directly upon the exposed disc of the clutch and obviates the pins and other elements heretofore used in engaging the discs of enclosed clutch mechanisms; to provide a threaded support for the clutch disc engaging means directly on its shaft, and which means is adapted to be adjusted from time to time to compensate for the wearing of the clutch discs; and to provide means for releasably holding said threaded support in adjusted positions.

The above being among the objects of the present invention, the same consists in certain novel details of construction and combinations of parts to be hereinafter described with references to the accompanying drawings, and then claimed, having the above and other objects in view.

An illustrative embodiment of the invention is shown in the accompanying drawings, in which:

Fig. 1 is a fragmentary side elevation of a marine motor which is equipped with my improved reverse gearing.

Fig. 2 is a side elevation, partly in section, of reverse gearing embodying my invention.

Fig. 3 is a transverse vertical section taken on line 3—3 of Fig. 2.

Fig. 4 is a transverse vertical section taken on line 4—4 of Fig. 2.

Fig. 5 is a reduced transverse vertical section taken on line 5—5 of Fig. 2.

Fig. 6 is a side elevation partly in section of a reverse gearing showing a modification of the invention.

Fig. 7 is a view similar to Fig. 6 but showing a further development of the invention.

My improved reversing gearing includes a rotatable member which is journaled on one of a pair of axially aligned shafts, geared to the other shaft by a planetary system of gears and equipped with clutch and brake mechanism by which it may be selectively conditioned to cause the shafts to rotate in the same direction or in opposite directions. The clutch and brake mechanisms are provided with control apparatus which is adapted to engage the clutch mechanism while the brake mechanism is released so as to produce unitary rotation of the shafts and rotatable member in a single direction. This control apparatus is also adapted to apply the brake mechanism when the clutch mechanism is disengaged so as to hold the rotatable member at rest and permit one shaft while rotating in one direction to drive the other shaft in an opposite direction through the planetary gearing.

The rotatable members which carry the planetary gearing systems and clutch discs of prior reversing gearings of this kind have consisted of a cage or casing-like structure which has been journaled at spaced locations on both the driving and driven shafts of the mechanism. The rotatable cages or casings heretofore used have been built up of many parts, and generally the planetary gearing system and clutch apparatus have been located between those parts of the rotatable structure which are journaled on the driving and driven shafts respectively.

In the form shown in Figs. 1 to 5, inclusive, my improved reversing gearing includes a driving shaft 1 having an end recess 2 and an axially aligned driven shaft 3 which has a reduced end section 4 that is received in a bushing 5 located in the end recess 2 of the driving shaft. Formed on the adjacent end portions of the driving and driven shafts 1 and 3 are gears 6 and 7, respectively, the gear of the driven shaft being slightly larger in diameter than the gear of the driving shaft. A rotatable member 8 comprising an integral cylinder having a thick wall 9, a central passage 10 and under cut end recesses 11 and 12, is concentrically mounted on the driven shaft 3 and rotatably supported thereon by spaced rolling contact bearings 13 and 14, each including a pair of ball races and a series of ball bearings.

The thickened wall portion 9 of the cylinder 8 is provided with a series of circumferentially arranged apertures 15 in which pins 16 are mounted. Journaled on the pins 16 are pinions 17 which mesh with the gear 6 of the driving shaft 1. Longitudinally extending apertures 18 are also formed in the thickened wall portion 9 of the cylinder between the apertures 15. Mounted in the apertures 18 are pins 19 on which are journaled pinions 20, each having elongated teeth which mesh with the teeth of one of the pinions 17 and with the teeth of the gear 7 on the driven shaft 3. These pinions are located in the end recess 12 of the cylinder 8 and they are rotatably supported by the free ends of the pins 16 and 19, respectively. The pinions are held against outward displacement from the recess 12 by a plate-like ring 21 which is secured to the end of the cylinder 8 by screws 22.

Rigidly mounted on the driven shaft 3 and on the cylinder 8 are alternate clutch discs 23 and 24 respectively which are located in the recess 11 of the left end of the cylinder as viewed in Fig. 2. These discs are adapted to be frictionally engaged together so as to form a releasable, direct driving connection between the cylinder 8 and the driven shaft 3. The outermost disc 24 of the driven shaft 3 is exposed at the left end of the cylinder so as to permit the direct application of force thereon for frictionally holding the discs together.

The reversing gearing is provided with manually controllable clutch operating mechanism which includes an adjustable collar 25 that is threaded at 26 directly on the shaft 3 adjacent the outermost clutch disc 24. This collar is provided with spaced outwardly extending pairs of lugs 27 between which are located levers 28 having forwardly extending arms 29 which bear upon the exposed disc 24, as illustrated in Fig. 2.

The adjustable collar 25 carries a detent or plunger 26' which is slidably mounted in an aperture 27' formed in the collar. The forward end of this detent is held in one of a circularly arranged series of spaced apertures 28' in the exposed clutch disc 24 by a spring 29'. The collar 25 may be screwed forwardly or rearwardly to produce the proper frictional engagement between the clutch discs when the detent 26' is retracted, and when the detent is released and projected into one of the openings 28' it holds the collar against displacement from an adjusted position.

The levers 28 are journaled intermediate their ends, on pins 30 which are received in registering apertures in the lugs 27. The rear extremity of each lever 28 is pivotally connected by a link 31 to a sleeve 32 which is axially slidable on the driven shaft 3, as illustrated in Fig. 5, the links 31 being pivotally mounted on the sleeve 32 at 33. Formed in the sleeve 32 is a circumferential groove 34 which receives pins 35 on the respectively opposite prongs 36 of a fork that is pivotally supported by a shaft 37 journaled in the side walls of the housing 38 in which the reversing gear mechanism is enclosed. An operating lever 39 is rigidly secured on the external end of the shaft 37 by a clamping member 40, in the manner illustrated in Fig. 1.

Surrounding the cylinder 8 is a split brake band 41 which has a lug 42 opposite its split side that is received in a recess 43 of a boss 44 on the adjacent side of the casing. The lug 42 is located substantially diametrically opposite from the split 45 on the other side of the band, the latter side of the band being supported by a lug 46 which is integrally formed on one end of the band adjacent the split portion 45 thereof. Integrally formed on the other end of the band 41 is a lug 47 which engages the upright post 48 that is slidably received in an aperture of an internal boss 49 which is formed on the casing 38.

Control mechanism is provided for the brake band which includes a lever 50 that is pivoted at 51 on a pin 52 extending outwardly from a boss 53 on the exterior of the casing 38. This lever has a set screw 54 threaded on its forward end which registers with and bears upon the upper extremity of the post 48 and its rear end has a curved portion 55 which rests upon a roller 56 that extends outwardly from the side of the operating lever 39. When the operating lever 39 is pulled rearwardly, or to the right, as viewed in Fig. 2, the roller 56 raises the curved end portion 55 of the lever 50, tilting the latter about its pivot 51 and urging the forward end thereof downwardly so as to forcefully apply the band 41 to the cylinder 8. A notch 57 formed in the rear extremity of the lever 50, releasably holds the operating lever in its rearward position.

In the forms of my improved reversing gearing, shown in Figs. 6 and 7, the construction is substantially the same as that described above and illustrated in Figs. 1 to 5 and the parts of the mechanism in these forms are designated by numerals which are the same as the numerals that designate corresponding or substantially identical parts in Figs. 1 to 5, inclusive. The cylinder 8 of the reversing gearing shown in Fig. 6 is rotatably supported on the driven shaft 3 by a bearing which includes a pair of ball races 58 having adjacent grooves therein in which two series of ball bearings 59 are located. These series of ball bearings are located in close proximity to each other so as to permit a reduction in the length of the reversing gearing as compared to the length of the gearing shown in Fig. 2.

The cylinder 8a of the form of my invention shown in Fig. 7 is rotatably supported on the driven shaft 3 by a single bearing 60 which includes only one series of ball bearings 61. With this construction the reversing gearing is even more compact than that shown in Fig. 6.

In each form of the invention the rotatable member, the planetary gearing and the discs of the clutch mechanism constitutes a rotatable planetary unit. The relatively solid, integral, metal cylindrical casing structure is of simple and inexpensive construction and has undercut end recesses for receiving the planetary gearing and clutch mechanism, and in each form these cylinders are rotatably mounted on only one shaft solely by bearings that are located between the clutch mechanism and planetary gearing.

In operation, the driving shaft 1 is connected to a prime mover 62 by which it is rotated in a counter-clockwise direction as viewed in Fig. 3. When the clutch discs 23 and 24 are engaged together and the brake band 41 is released, the cylinder 8 is rotated in unison with the driving shaft 1 through the gear 6 of the latter and the pinions 17 and 20 of the planetary gearing system. Under these conditions the drive shaft 3 is turned in the same direction as the rotation of the driving shaft. When the clutch discs 23 and 24 are disengaged and the cylinder 8 is held against rotation by application of the brake band 41, the gear 6 of the driving shaft rotates all of the pinions 17 with which it meshes in a clockwise direction and the pinions 17, in turn, rotate the pinions 20 in a counter-clockwise direction. The elongated teeth of the latter pinions which also mesh with the teeth of the gear 7 on the driven shaft 3 cause the latter to be driven in a clockwise direction, as viewed from the left end of Fig. 2, which is opposite in direction to the rotation of the driving shaft 1.

By manipulation of the operating lever 39, the clutch plates are disengaged when the brake band is applied and the brake band is released when the clutch plates are engaged together. The transmission may be placed in a neutral condition in which the brake is released and the clutch plates are disengaged by tilting the operating lever 39 to the right from the position shown in Fig. 2, until the roller 56 is located at the downwardly curved portion 63 of the lever 50. With this setting of the device, the cylinder 8 is free to rotate relative to both the driving and driven shafts, 1 and 3 respectively, and therefore the driving shaft 1 may rotate while the driven shaft 3 remains at rest.

Formal changes may be made in the specific embodiment of the invention described without departing from the spirit and substance of the broad invention, the scope of which is commensurate with the appended claims.

I claim as my invention:

1. A planetary transmission including a pair of shafts, a member concentric with one of said shafts including an integral cylinder having recesses in its respectively opposite ends and having a centrally located outwardly extending web portion, bearing means between the inner periphery of said web portion and one of said shafts, said cylinder being rotatably supported on the latter shaft independently by said bearing means, a planetary gearing system located in one of said recesses, clutch mechanism in the other recess, said clutch mechanism and planetary gearing being symmetrically located with respect to said web portion so as to produce balanced overhanging structures at the opposite sides of said web portion and means for releasably holding said member at rest.

2. A planetary transmission including a pair of shafts, a rotatable unit journaled on one of said shafts including clutch discs and a planetary gearing system, a brake for releasably holding said unit at rest, clutch plates on one of said shafts for cooperating with the discs of said unit, and control apparatus for engaging said discs together having a collar pivotally carrying toggle levers and adjustably threaded directly on one of said shafts for varying the engaging relation of said discs and the location on one of said discs at which said toggle levers engage the latter.

3. A planetary transmission including a pair of shafts, a rotatable unit journaled on one of said shafts including clutch discs and a planetary gearing system, a brake for releasably holding said unit at rest, clutch plates on one of said shafts for co-operating with the discs of said unit, one of said discs being exposed at an extremity of said rotatable unit, a collar threaded for adjustment directly on one of said shafts, toggle levers pivotally mounted on said collar and directly engageable with different portions of said exposed clutch disc when said collar is in diverse adjusted positions, and clutch operating apparatus for urging said levers against said exposed clutch disc so as to engage said discs together.

4. Reversing gearing including driving and driven shafts, a rotatable unit journaled on said driven shaft including a planetary gearing system, gears on said driving and driven shafts respectively meshed with said planetary gearing system, co-operating clutch elements on said driven shaft and rotatable unit respectively, and means for engaging said clutch elements together having an adjustable member directly threaded on said driven shaft for varying the engaging relation of said clutch elements, and toggle levers pivotally secured to said member and engageable with different portions of one of said clutch elements.

5. Reversing gearing including driving and driven shafts, a rotatable unit journaled on said driven shaft including a planetary gearing system, gears on said driving and driven shafts respectively meshed with said planetary gearing system, co-operating clutch elements on said driven shaft and rotatable unit respectively, one of the clutch elements of said rotatable element being exposed at an extremity of the latter and having apertures therein, means for engaging said clutch elements together, having an adjustable collar threaded on said driven shaft, and a detent slidably mounted on said collar in registration with the apertures of said exposed clutch element for releasably holding said collar in an adjusted position.

6. Reversing gearing including a pair of shafts, a pair of gears, one fixed on each shaft, a planetary gearing unit having a series of pinions at one end, meshed with said gears and having clutch elements at the other end, and a pair of spaced bearings located between said pinions and clutch elements, said unit being rotatably supported one one of said shafts solely by said bearings.

7. Reversing gearing including a pair of shafts, a pair of gears, one fixed on each shaft, a planetary gearing unit having a series of pinions at one end, meshed with said gears and having clutch elements at the other end, and a bearing located between said pinions and said clutch elements, said unit being rotatably supported on one of said shafts solely by said bearing.

8. A planetary transmission including a pair of shafts, a rotatable unit journaled on one of said shafts including planetary gearing, cooperating clutch elements on said unit and on one of said shafts respectively, means for releasably holding said unit at rest, control apparatus for engaging said clutch elements together having a collar adjustably threaded on one shaft for varying the engaging relation of said clutch elements, and releasable means normally coacting between said collar and a clutch element of the shaft for holding said collar against unintended rotation relative to said shaft.

9. A planetary transmission including a housing, a pair of shafts in said housing, a rotatable member concentric with one of said shafts having an open end recess in one extremity thereof, spaced gears mounted in said recess having unobstructed passages therebetween communicating with the open end of said recess for the direct admission of lubricant into said housing, cooperating clutch elements at the other end of said member fixed to the latter and to one of said shafts respectively, and means for releasably holding said member at rest.

RICHARD H. WEINERT.